(12) United States Patent
Takeguchi et al.

(10) Patent No.: US 8,325,475 B2
(45) Date of Patent: Dec. 4, 2012

(54) ELECTRONIC DEVICE

(75) Inventors: Koichiro Takeguchi, Hachioji (JP); Shigeo Hayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/845,534

(22) Filed: Jul. 28, 2010

(65) Prior Publication Data

US 2011/0122557 A1 May 26, 2011

(30) Foreign Application Priority Data

Nov. 25, 2009 (JP) ................................. 2009-267336

(51) Int. Cl.
G06F 1/16 (2006.01)
H01R 13/73 (2006.01)

(52) U.S. Cl. ...................... 361/679.4; 438/569; 438/572; 438/573

(58) Field of Classification Search ............. 361/679.02, 361/679.4–679.45, 679.55; 439/527, 529, 439/532, 533, 542, 544, 569, 572, 573
See application file for complete search history.

(56) References Cited

U.S. PATENT DOCUMENTS

| | | | | |
|---|---|---|---|---|
| 4,710,137 A | * | 12/1987 | Perdue et al. | 439/457 |
| 6,773,286 B1 | * | 8/2004 | Wu | 439/247 |
| 7,192,305 B2 | * | 3/2007 | Kato et al. | 439/544 |
| 7,207,813 B1 | * | 4/2007 | Chiang et al. | 439/148 |
| 7,416,441 B2 | * | 8/2008 | Nishiyama | 439/529 |
| 8,182,284 B2 | * | 5/2012 | Kuo | 439/545 |
| 2010/0003849 A1 | * | 1/2010 | Murakami | 439/527 |

FOREIGN PATENT DOCUMENTS

| | | |
|---|---|---|
| JP | U S39-011498 | 5/1964 |
| JP | S57-107285 | 7/1982 |
| JP | U H01-043906 | 12/1989 |
| JP | 06-017345 | 5/1994 |
| JP | 07-051819 | 11/1995 |
| JP | 2004-259292 | 9/2004 |
| JP | 2005-094507 | 4/2005 |

OTHER PUBLICATIONS

Notice of Reasons for Rejection mailed by the Japan Patent Office on May 10, 2011 in corresponding Japanese app. No. 2009-267336 in 5 pages.
Notice of Reasons for Rejection mailed by the Japan Patent Office on Dec. 7, 2010 in corresponding Japanese app. No. 2009-267336 in 8 pages.
Japanese Decision to Grant a Patent mailed on Mar. 21, 2012 for Japanese Application No. 2011-185224 filed on Aug. 26, 2011.

* cited by examiner

*Primary Examiner* — Adrian S Wilson (74) *Attorney, Agent, or Firm* — Knobbe, Martens, Olson & Bear, LLP (57) ABSTRACT

According to one embodiment, an electronic device includes a side wall, an interface component, a partition wall, and a protrusion. The side wall is formed on one of the bottom wall and the top wall of a housing to spatially separate the inside of the housing from the outside. The side wall includes a through opening. The interface component faces the through opening in the housing. The partition wall is formed on the one of the bottom wall and the top wall and coupled perpendicularly to the side wall. The partition wall spatially separates the inside of the housing and a component retainer formed as a cutout or a recess of the housing. The protrusion is formed on the one of the bottom wall and the top wall to be spaced apart from the partition wall. The interface component is held between the partition wall and the protrusion.

9 Claims, 6 Drawing Sheets

ELECTRONIC DEVICE

CROSS-REFERENCE TO RELATED APPLICATIONS

This application is based upon and claims the benefit of priority from Japanese Patent Application No. 2009-267336, filed Nov. 25, 2009, the entire contents of which are incorporated herein by reference.

FIELD

Embodiments described herein relate generally to an electronic device.

BACKGROUND

For example, Japanese examined utility model application publication No. H6-17345 discloses a conventional electronic device having a housing in which an interface component such as a connector is attached to face a through hole (opening) formed in the side wall of the housing. The connector is supported between a pair of supporting members (locking claws) provided on the bottom wall of the housing.

Besides, there have been known electronic devices, such as notebook personal computers and personal digital assistants (PDAs), having a flat housing in which a component retainer such as a battery retainer is formed in such a manner as to partly cut out the side wall of the housing. A component such as a battery is removably attached to the component retainer. The component retainer is spatially separated from the inside of the housing by a partition.

In an electronic device having a housing in which a component retainer is formed in the side wall of the housing as described above, a component is held in the component retainer. Therefore, an interface component cannot be provided. This is likely to limit the layout of the interface component in a region along the side wall in which the component retainer is formed.

Besides, in the conventional electronic device in which the interface component is supported between the supporting members, it is required to secure a space for the supporting members. Accordingly, the interface component cannot be arranged close (adjacent) to a component retainer by the space for the supporting members in a region along the side wall in which the component retainer is formed. This also is likely to limit the layout of the interface component.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a side wall, an interface component, a partition wall, and a protrusion. The side wall is formed on one of the bottom wall and the top wall of a housing. The side wall is configured to spatially separate the inside and outside of the housing and comprises a through opening. The interface component faces the through opening in the housing. The partition wall is formed on the one of the bottom wall and the top wall and coupled perpendicularly to the side wall to form a corner. The partition wall is configured to spatially separate the inside of the housing and a component retainer formed as a cutout or a recess of the housing at a position on a side of the interface component in a direction along the side wall. The protrusion is formed on the one of the bottom wall and the top wall to be spaced apart from the partition wall. The interface component is held between the partition wall and the protrusion.

According to another embodiment, an electronic device comprises a side wall, a partition wall, and an interface component. The side wall is formed on one of the bottom wall and the top wall of a housing. The side wall is configured to spatially separate the inside and outside of the housing and comprises a through opening. The partition wall is formed on the one of the bottom wall and the top wall and coupled perpendicularly to the side wall to form a corner. The partition wall is configured to spatially separate the inside of the housing and a component retainer formed as a cutout or a recess of the housing. The interface component is located adjacent to the partition wall and faces the through opening in the housing.

According to still another embodiment, an electronic device comprises a housing, a module, a connector, and a second protrusion. The housing comprises a first side wall including an opening and a second side wall extending in a direction perpendicular to the first side wall. The module is supported by the second side wall outside the housing. The connector is supported by the second side wall inside the housing and exposed from the opening. The second protrusion extends from the second side wall and supports the connector at a position different from a position supported by the second side wall.

In the following embodiments, like components will be used with common reference numerals, and the same description will not be repeated.

With reference to FIGS. 1 to 6, a description will be given of an electronic device 1 according to a first embodiment.

Figure 1:
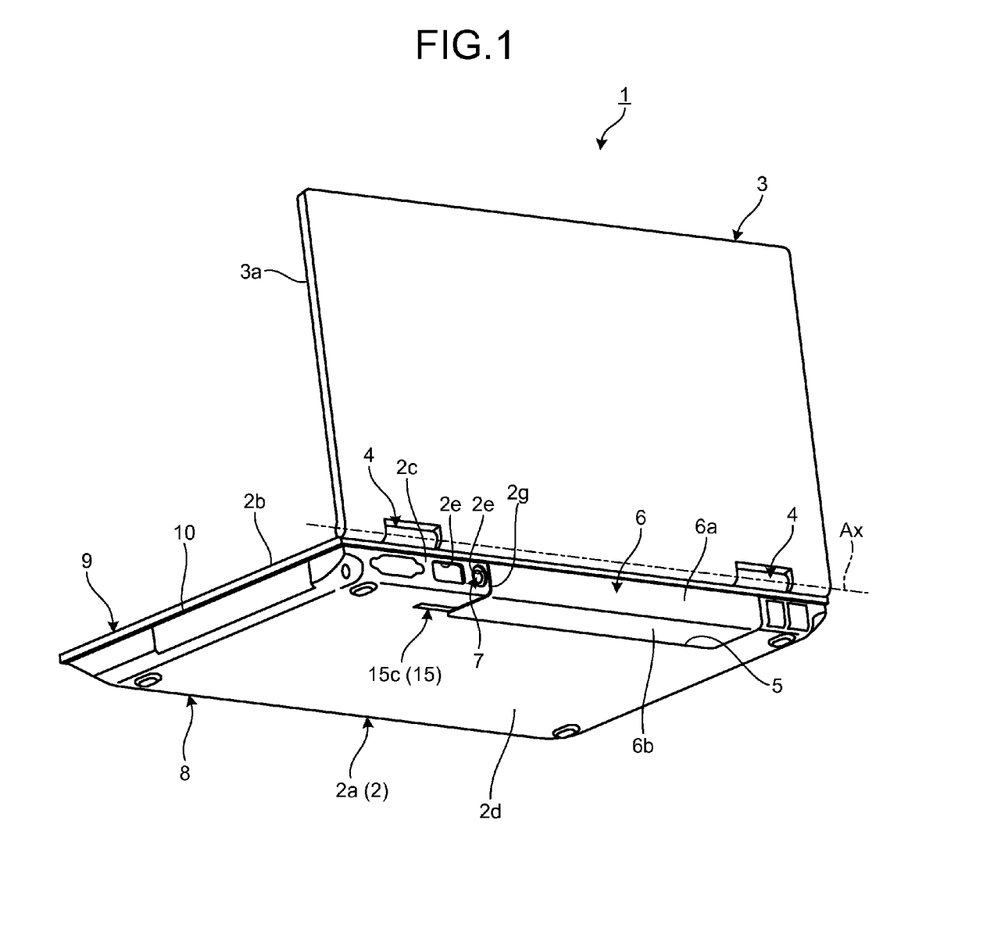
FIG. 1 is an exemplary perspective view of an electronic device according to a first embodiment.

As illustrated in FIG. 1, the electronic device 1 of the first embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax between a closed position and an open position (not illustrated).

The first body 2 comprises a housing 2a that houses a circuit board, a hard disk, a cooling fan, and the like. The circuit board is mounted with a central processing unit (CPU), a read only memory (ROM), a random access memory (RAM), and other electronic components (all not illustrated). The first body 2 is provided with a keyboard (not illustrated) as an input device configured to be exposed on a front surface 2b. On the other hand, the second body 3 is provided with a display device (not illustrated) such as a liquid crystal display (LCD) panel configured to be exposed on a front surface 3a. When the first body 2 and the second body 3 are in the open position, the keyboard and the display device are exposed to allow the user to use them. The housing 2a is made of, for example, synthetic resin, metal, or the like.

The housing 2a is relatively thin and flat, and has a side wall 2c that spatially separates the inside of the housing 2a from the outside. In the first embodiment, the side wall 2c stands on a flat plate-like rectangular bottom wall 2d.

A component retainer 5 is formed in the housing 2a by cutting out a portion of the housing 2a in a rectangular shape. In the first embodiment, the component retainer 5 serves as a battery retainer. That is, a battery as a component 6 is removably placed on the component retainer 5. The component 6 is formed into a rectangular parallelepiped to fit in the component retainer 5. As illustrated in FIG. 1, in the state where the component 6 is held in the component retainer 5, the surface of the side wall 2c of the housing 2a and a side 6a of the component 6 are substantially flat. Similarly, the bottom wall 2d (bottom surface) of the housing 2a and a bottom 6b of the component 6 are substantially flat.

A through opening 2e is formed in the side wall 2c where the component retainer 5 is formed. An interface component 7 such as a connector is attached inside the housing 2a to face the through opening 2e. The through opening 2e may be formed as a through hole in the side wall 2c. If the housing 2a is formed of a combination of a first part 8 and a second part 9 as illustrated in FIG. 1, the through opening 2e may be formed as a cutout at a boundary between the parts 8 and 9. In the first embodiment, the interface component 7 closest to the component retainer 5 is described as a connector into which an alternating current (AC) adapter cord pin is inserted. However, this is byway of example only, and the interface component 7 may be a local area network (LAN) cable connector, a universal serial bus (USB) connector, a female connector into which a connector pin of a head phone or a microphone is inserted, or the like.

In the above configuration, as illustrated in FIG. 1, the component retainer 5 (and the component 6 held in the component retainer 5) and the interface component 7 facing the through opening 2e are arranged side by side in a direction along the side wall 2c (in the first embodiment, the side wall 2c closest to the rotation axis Ax of the hinge mechanism 4 and along the rotation axis Ax).

Figure 2:
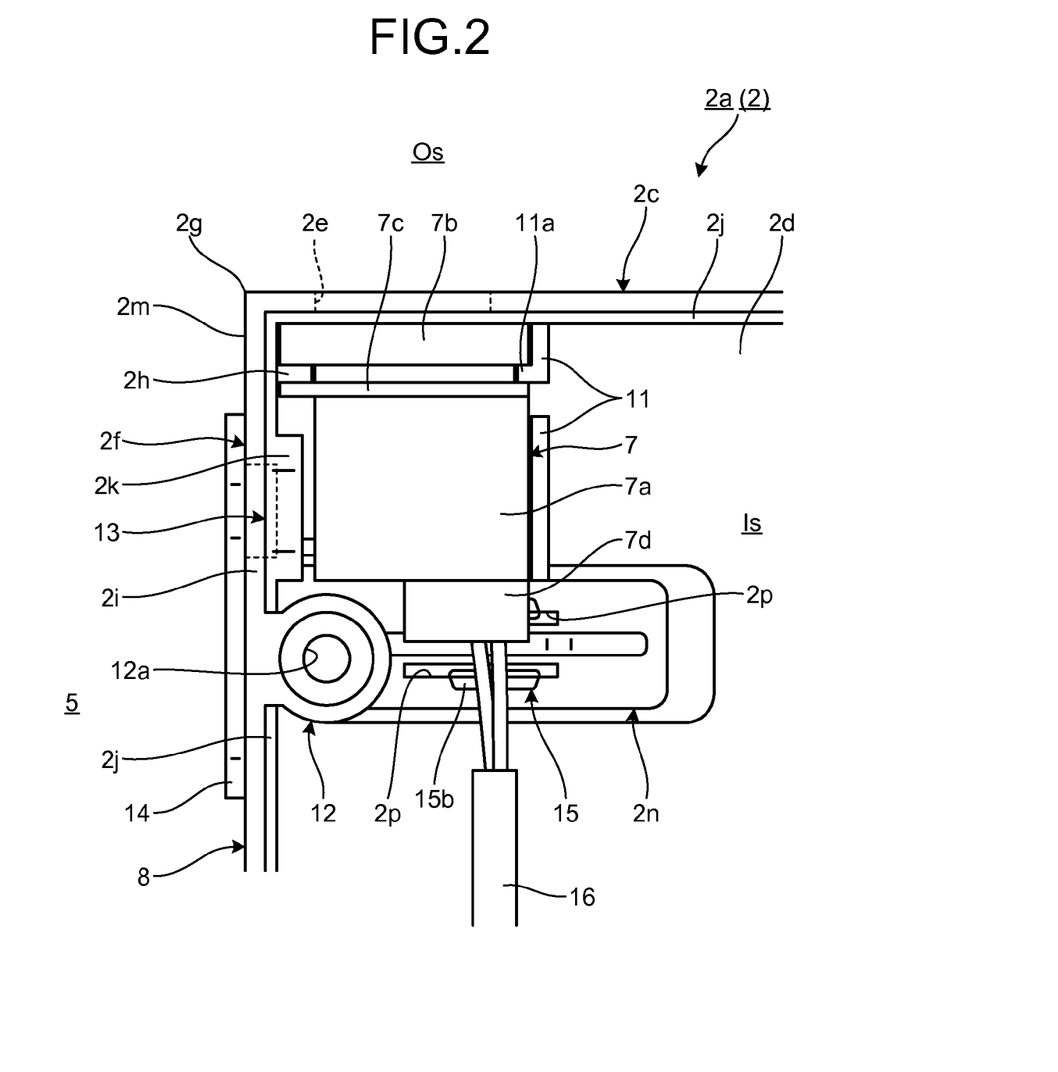
FIG. 2 is an exemplary plan view of a corner between a partition wall and a side wall of the housing of the electronic device with a top wall removed in the first embodiment.
Figure 3:
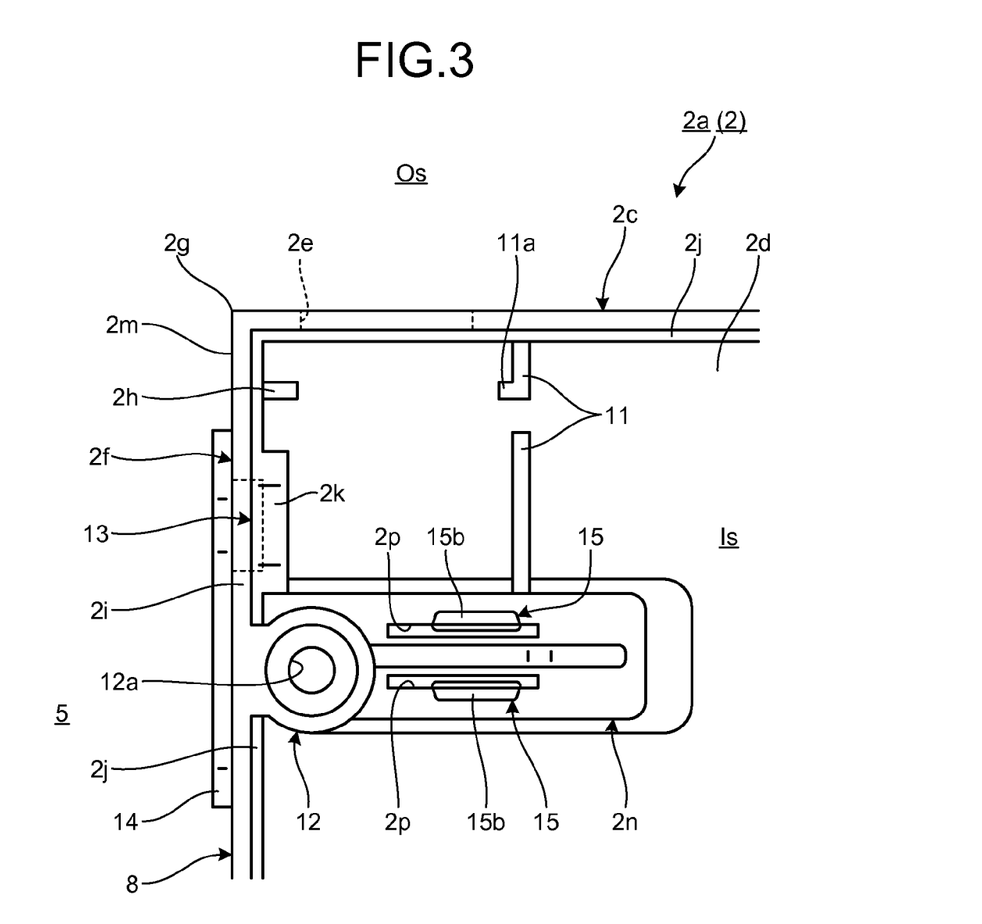
FIG. 3 is an exemplary plan view of a corner of the housing of the electronic device in the first embodiment.

In the following, a description will be given of the attachment structure of the interface component 7 closest to the component retainer 5. As illustrated in FIGS. 2 and 3, the housing 2a comprises the flat plate-like bottom wall 2d, the side wall 2c, and a partition wall 2f. The side wall 2c stands vertically (in the thickness direction of the housing 2a) on the bottom wall 2d and spatially separates the inside Is of the housing 2a from the outside Os. The partition wall 2f stands vertically on the bottom wall 2d and spatially separates the inside Is of the housing 2a from the component retainer 5. The side wall 2c and the partition wall 2f are coupled perpendicularly to form a corner 2g.

As illustrated in FIGS. 2 and 3, a wall-like protrusion 11 is provided on the bottom wall 2d at a position different from the partition wall 2f. More specifically, the protrusion 11 is provided spaced apart from the partition wall 2f in parallel with the partition wall 2f. The interface component 7 is held between the partition wall 2f and the protrusion 11. With this, according to the first embodiment, the interface component 7 can be attached close to the corner 2g. In the first embodiment, the partition wall 2f and the protrusion 11 position the interface component 7 in the horizontal direction of FIG. 2, and also restrict the horizontal movement of the interface component 7.

Figure 4:
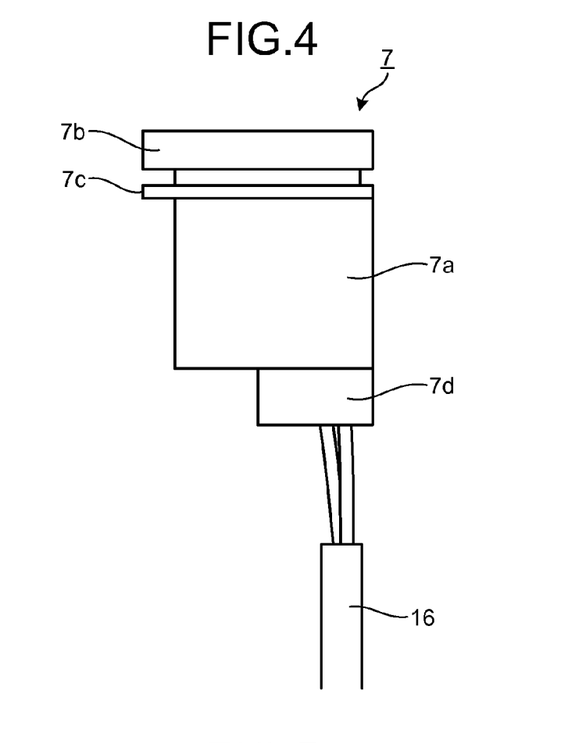
FIG. 4 is an exemplary plan view of an interface component in the first embodiment.

As illustrated in FIGS. 2 and 4, the interface component 7 comprises a rectangular parallelepiped main body 7a, a first flange 7b, and a second flange 7c. The first flange 7b faces or is in contact with the inner surface of the side wall 2c. The second flange 7c is provided spaced apart from the first flange 7b in parallel with the first flange 7b. The interface component 7 further comprises a harness pull-out portion 7d on the opposite side of the first flange 7b with respect to the main body 7a. The harness pull-out portion 7d is provided to lay out a harness 16 to the inside Is of the housing 2a. As illustrated in FIG. 2, when the interface component 7 is attached, the harness pull-out portion 7d is located close to the protrusion 11.

As illustrated in FIGS. 2 and 3, the partition wall 2f and the protrusion 11 are provided with projections 2h and 11a between the first flange 7b and the second flange 7c. in the first embodiment, the projections 2h and 11a position the interface component 7 in the vertical direction of FIG. 2, and also restrict the vertical movement of the interface component 7. If an external force is applied to the interface component 7 from a component inserted through the through opening 2e or the like from the outside Os of the side wall 2c to the inside Is, the projections 2h and 11a prevent the interface component 7 from being pushed toward the inside Is. When attached in the housing 2a, the interface component 7 does not need to be in contact with all the projections 2h and 11a, the partition wall 2f, and the protrusion 11. The interface component 7 can be arranged to allow some variations due to production tolerance.

The housing 2a of the first embodiment comprises the first part 8 and the second part 9 (see FIG. 1). The first part 8 comprises the bottom wall 2d, the side wall 2c, the partition wall 2f, the protrusion 11, and the like illustrated in FIGS. 2 and 3. The second part 9 is coupled with the first part 8 to cover the opening (not illustrated) of the first part 8 on the upper side in FIG. 1. The first part 8 is located below the second part 9 in FIG. 1. The first part 8 and the second part 9 are coupled with each other by a coupling member (not illustrated) such as a screw. In the first embodiment, as illustrated in FIGS. 2 and 3, the first part 8 is provided with a boss 12 into which a coupling member such as a screw is threaded. More specifically, the boss 12 is formed in the shape of a column extending vertically on the bottom wall 2d. In the first embodiment, the boss 12 is located close to the partition wall 2f compared to the protrusion 11, and is integrated with the partition wall 2f. Besides, as illustrated in FIG. 2, the boss 12 is located on the opposite side of the side wall 2c with respect to the interface component 7. The boss 12 has a bottomed circular hole 12a as an opening formed on the first part 8 side. If the coupling member is a screw, the bottomed circular hole 12a serves as a female screw.

As illustrated in FIGS. 2 and 3, at the end 2i of the partition wall 2f and the side wall 2c, a projecting wall 2j is formed along the periphery of the inside Is. The engagement of the projecting wall 2j and a groove (not illustrated) of the second part 9 suppresses the displacement of the first part 8 and the second part 9.

Figure 5:
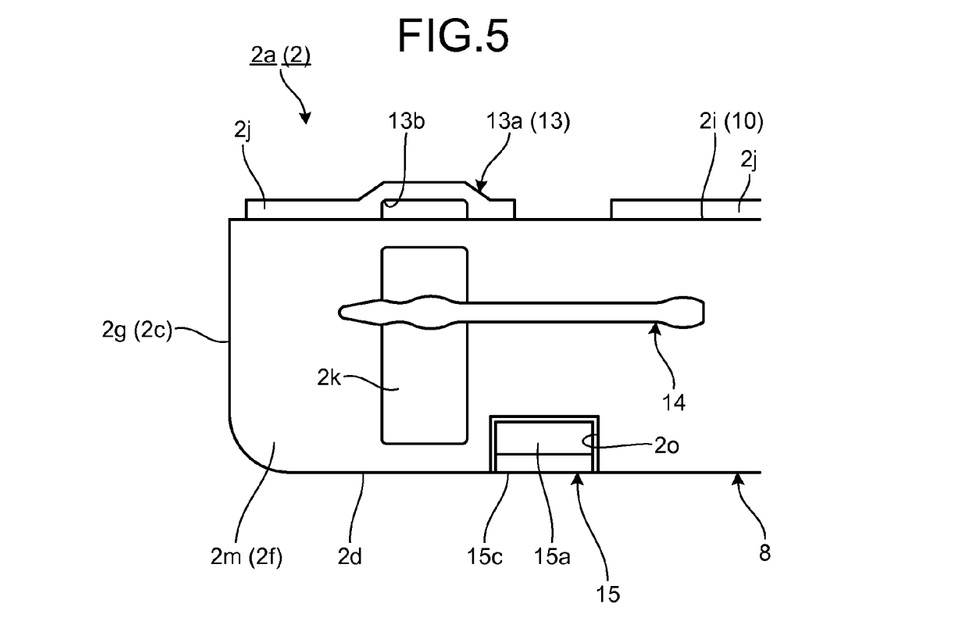
FIG. 5 is an exemplary side view of the partition wall of the housing of the electronic device viewed from the side of a component retainer in the first embodiment.

As illustrated in FIGS. 2, 3, and 5, in the first embodiment, the partition wall 2f is provided with a recessed wall 2k that is recessed toward the inside Is of the housing 2a. As illustrated in FIG. 5, the recessed wall 2k extends from the end 2i of the partition wall 2f to the bottom wall 2d with substantially a constant width in the thickness direction of the housing 2a (the vertical direction of FIG. 5). The shape of the recessed wall 2k increases the rigidity of the partition wall 2f.

As illustrated in FIG. 5, the recessed wall 2k protrudes above the end 2i. In the first embodiment, the portion protruding from the end 2i is an engaging portion 13a of an engaging mechanism 13. The engaging portion 13a includes part of the recessed portion of the recessed wall 2k as an engaging recessed portion 13b. With the engaging recessed portion 13b engaged with a claw or a protrusion (not illustrated) formed as an engaging portion on the second part 9, the first part 8 and the second part 9 are engaged with each other.

In the first embodiment, as illustrated in FIG. 2, since the interface component 7 is located close to the corner 2g, the boss 12 is a little apart from the corner 2g. Accordingly, the first part 8 and the second part 9 are likely to separate from each other on the side closer to the corner 2g than the boss 12. In view of this, according to the first embodiment, the engaging mechanism 13 is provided closer to the corner 2g than the boss 12 to prevent the separation of the first part 8 and the second part 9. Incidentally, the engaging recessed portion 13b (the engaging portion 13a) that constitutes the engaging mechanism 13 may be provided to the side wall 2c. In this case, however, it is necessary to avoid interference with the interface component 7, and it is difficult to form a recessed portion as with the recessed wall 2k formed in the partition wall 2f. Therefore, the engaging recessed portion 13b (the engaging portion 13a) with higher rigidity is provided more preferably to the partition wall 2f than the side wall 2c.

In the first embodiment, as illustrated in FIG. 5, a guide rib 14 is formed on an outer surface 2m of the partition wall 2f on the outside Os of the housing 2a. The guide rib 14 extends from the opening of the cutout of the component retainer 5 (the left side of FIG. 5) to the back side (the right side of FIG. 5) in parallel to the bottom wall 2d. The guide rib 14 slidably guides the component 6 held in the component retainer 5. On a side of the component 6 is formed a groove (not illustrated) in which the guide rib 14 is fitted. The guide rib 14 extends across the recessed portion of the recessed wall 2k. That is, the guide rib 14 prevents the opening of the recessed portion of the recessed wall 2k from expanding. This further increase the rigidity of the partition wall 2f.

Figure 6:
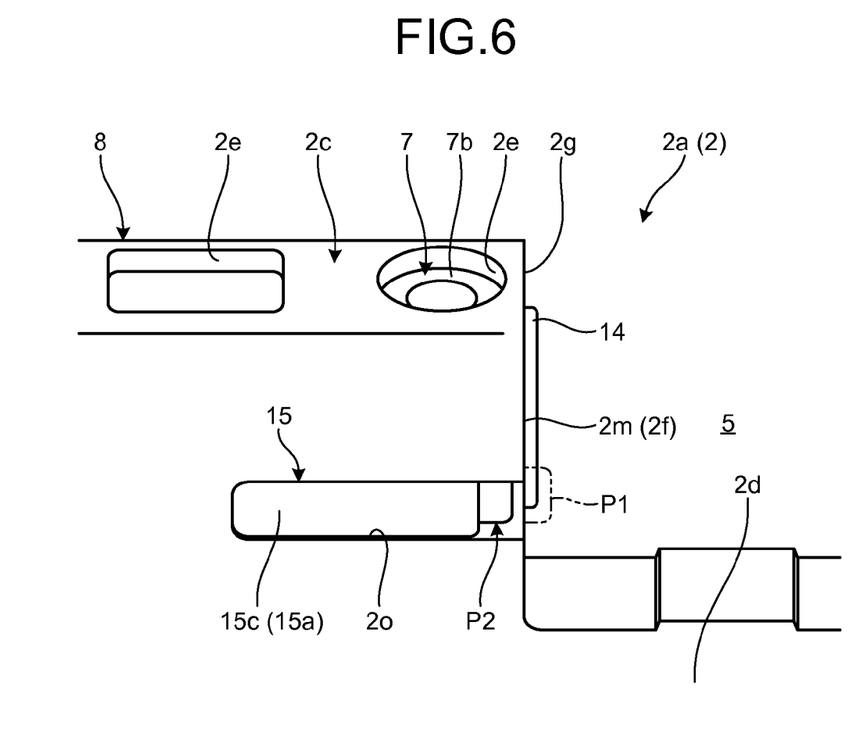
FIG. 6 is an exemplary perspective view of the electronic device with a component removed from the component retainer viewed from a different angle than in FIG. 1 in the first embodiment.

In the first embodiment, as illustrated in FIG. 3, the bottom wall 2d is provided with a second recessed wall 2n for housing a different functional component than the interface component 7. In the first embodiment, the second recessed wall 2n is a portion of the bottom wall 2d that is recessed toward the inside Is of the housing 2a. As illustrated in FIGS. 5 and 6, the second recessed wall 2n provides a groove 2o extending along a direction perpendicular to the partition wall 2f. The groove 2o holds a lock slider 15 that locks the component 6 held in the component retainer 5. As illustrated in FIG. 6, the second recessed wall 2n supports the lock slider 15 in the groove 2o such that the lock slider 15 is slidable between a lock position P1 and an unlock position P2. The lock slider 15 enters in the component retainer 5 in the lock position P1, while the lock slider 15 is retracted therefrom in the unlock position P2. More specifically, as illustrated in FIG. 3, an elongated through hole 2p is formed in the second recessed wall 2n. The through hole 2p extends in a direction perpendicular to the partition wall 2f. A claw 15b of the lock slider 15 passing through the through hole 2p from the groove 2o side to the inside Is of the housing 2a is engaged with the edge of the through hole 2p. The lock slider 15 comprises a elongated rectangular parallelepiped main body 15a, which is held in the groove 2o having a substantially rectangular cross section formed by the second recessed wall 2n as illustrated in FIGS. 5 and 6. As illustrated in FIGS. 5 and 6, a operation portion 15c of the main body 15a is exposed in the bottom wall 2d side. Thus, the user can operate the operation portion 15c to slide the lock slider 15 between the lock position P1 and the unlock position P2.

As illustrated in FIG. 2, the second recessed wall 2n is located such that it overlaps part of the interface component 7 (the harness pull-out portion 7d). Thus, the shape of the second recessed wall 2n increases the rigidity of part of the housing 2a that supports the interface component 7. In the first embodiment, as illustrated in FIG. 3, the second recessed wall 2n is connected to the partition wall 2f as well as the protrusion 11. In other words, the bottom wall 2d, the partition wall 2f, and the protrusion 11 are connected to one another by the second recessed wall 2n. This effectively increases the rigidity of part of the housing 2a close to the corner 2g.

As described above, according to the first embodiment, the interface component 7 is held between the partition wall 2f and the protrusion 11. Therefore, there is no need to provide a support member such as an engagement claw between the interface component 7 and the partition wall 2f as disclosed in Japanese examined utility model application publication No. H6-17345. Accordingly, the interface component 7 can be located further close to the component retainer 5. Thus, components such as the interface component 7 can be efficiently arranged in the region along the side wall 2c adjacent to the component retainer 5 in the housing 2a.

According to the first embodiment, the boss 12 is located closer to the partition wall 2f than the protrusion 11. Further, the boss 12 is located on the opposite side of the side wall 2c with respect to the interface component 7. With this, in the structure in which the interface component 7 is located close to the corner 2g, the boss 12 can be located further close to the corner 2g. Thus, it is possible to prevent the separation of the first part 8 and the second part 9, especially of regions close to the corner 2g.

According to the first embodiment, the engaging mechanism 13 is provided closer to the corner 2g than the boss 12 to engage the first part 8 and the second part 9. Thus, it is possible to prevent the separation of the first part 8 and the second part 9, especially of regions close to the corner 2g.

According to the first embodiment, the engaging portion 13a that constitutes the engaging mechanism 13 is formed in the partition wall 2f. It is easier to provide the engaging portion 13a to the partition wall 2f than to the side wall 2c and also to secure the rigidity of the engaging portion 13a.

According to the first embodiment, the partition wall 2f is provided with the recessed wall 2k that is recessed toward the inside Is of the housing 2a. At least part of the recessed wall 2k forms the engaging recessed portion 13b as the engaging portion 13a. That is, it is possible to increase the rigidity of the partition wall 2f and the engaging portion 13a by the recessed wall 2k as well as to achieve the relatively simple structure of the engaging portion 13a by at least part of the recessed wall 2k.

According to the first embodiment, the guide rib 14 that slidably guides the component 6 held in the component retainer 5 is formed on the outer surface 2m of the partition wall 2f on the component retainer 5 side such that it extends across the recessed wall 2k. The guide rib 14 further increase the rigidity of the partition wall 2f.

According to the first embodiment, the boss 12 is integrated with the partition wall 2f. Compared to the case where the boss 12 is provided separately from the partition wall 2f, it is possible to increase the rigidity of the housing 2a around the corner 2g.

According to the first embodiment, the harness 16 is pulled out to the inside Is of the housing 2a from a position closer to the protrusion 11 than the partition wall 2f. This prevents interference between the harness 16 and the boss 12 located close the partition wall 2f.

According to the first embodiment, the second recessed wall 2n is provided at a position overlapping part of the interface component 7 (the harness pull-out portion 7d in the first embodiment) in a direction perpendicular to the bottom wall 2d and is recessed toward the inside Is of the housing 2a. The second recessed wall 2n houses the lock slider 15 as a different functional component than the interface component 7. This further increases the rigidity of the housing 2a around the corner 2g.

Figure 7:
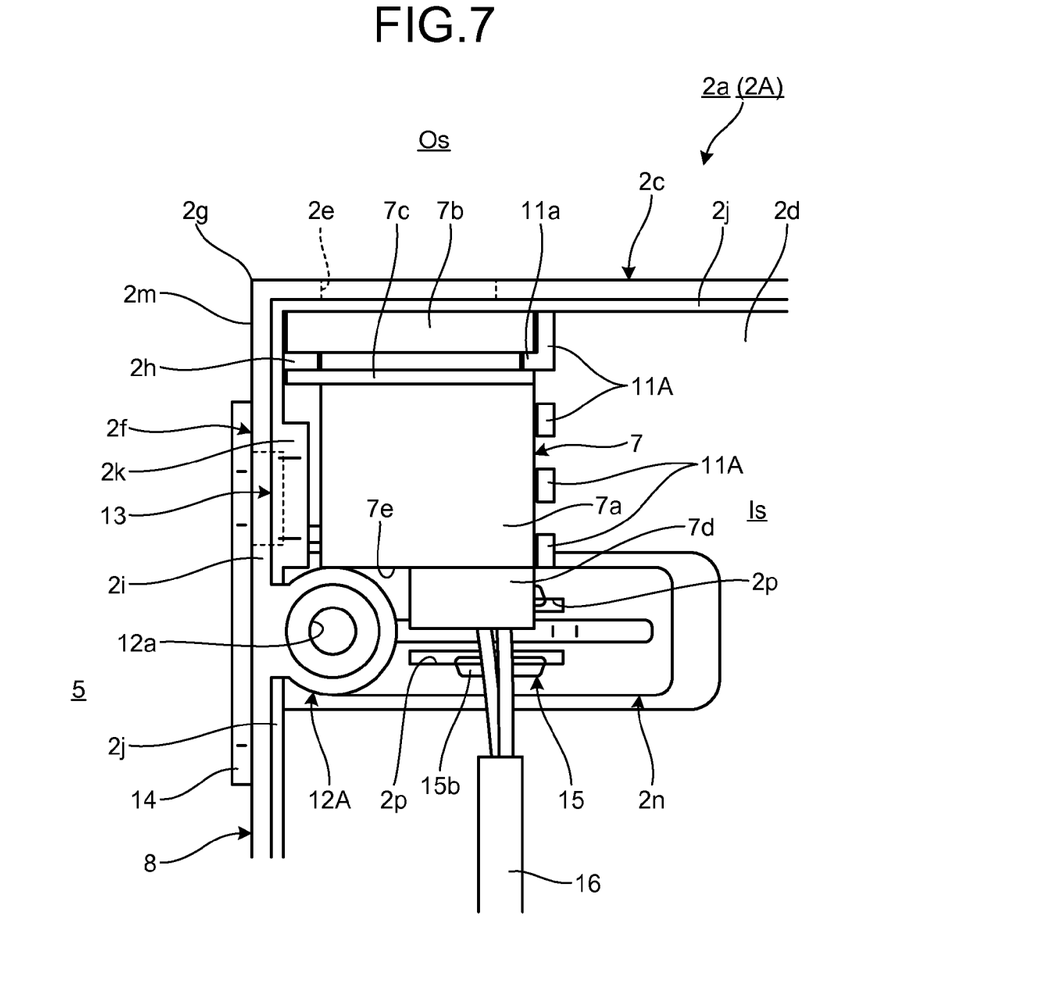
FIG. 7 is an exemplary plan view of a corner between a partition wall and a side wall of the housing of an electronic device with a top wall removed according to a second embodiment.

With reference to FIG. 7, a description will be given of a first body 2A of the electronic device 1 according to a second embodiment. In the second embodiment, as illustrated in FIG. 7, the interface component 7 is held between the side wall 2c and a boss 12A. With this, the boss 12A can be used to position the interface component 7 and also restrict the movement of the interface component 7. Moreover, the boss 12A can be located further close to the corner 2g compared to the first embodiment, which further increases the rigidity of the housing 2a around the corner 2g. Incidentally, the side wall 2c corresponds to a first side wall, while the partition wall 2f corresponds to a second side wall. Besides, the through opening 2e corresponds to an opening, the component 6 corresponds to a module, and the interface component 7 corresponds to a connector. The boss 12A corresponds to a second protrusion. In the second embodiment, the interface component 7 is supported by the side wall 2c, the partition wall 2f, a protrusion 11A, the boss 12A, and the like.

In the second embodiment, the protrusion 11A is formed as a plurality of columnar protrusions. As in the first embodiment, the interface component 7 is held between the partition wall 2f and the protrusion 11A. Otherwise, the second embodiment is basically similar to the first embodiment, and can achieve the same effect as described in the first embodiment.

The above embodiments are susceptible to various modifications and alternative forms. For example, the side wall, the partition wall, the protrusion, and the like can be provided to the top wall. Further, if the component retainer is formed into a recess, the embodiments can be applied to a partition wall between the component retainer and the inside of the housing. The interface component, the second recessed wall, and the like each can be in a different form and located in a different position. Besides, a different functional component than the lock slider can be employed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
a housing comprising a first wall, a second wall opposed to the first wall, a first side wall extending to the first wall and the second wall and comprising a hole, and a second side wall in a perpendicular direction to the first side wall;
a module supported by the second side wall outside the housing;
a first protrusion on the first wall in the housing, the first protrusion comprising a space from the second side wall;
a second protrusion on either the first wall or the second wall, the second protrusion comprising a coupling module to couple the first wall and the second wall together, and being closer to the second side wall than the first protrusion in the housing;
a connector between the first protrusion and the second side wall and between the first side wall and the second protrusion, a portion of the connector being exposed from the hole.

2. An electronic device comprising:
a housing comprising a first wall, a second wall opposed to the first wall, a first side wall extending to the first wall and the second wall and comprising a hole, and a second side wall in a perpendicular direction to the first side wall;
a module supported by the second side wall outside the housing;
a first protrusion on the first wall in the housing, the first protrusion comprising a space from the second side wall;
a second protrusion on the second wall, the second protrusion comprising a coupling module to couple the first wall and the second wall together, and being closer to the second side wall than the first protrusion in the housing;
a connector between the first protrusion and the second side wall and between the first side wall and the second protrusion, a portion of the connector being exposed from the hole.

3. The electronic device of claim 1, further comprising an engaging module configured to engage a first portion comprising the first wall and a second portion comprising the second wall, the engaging module being closer to a connection portion at which the first side wall is connected to the second side wall than the second protrusion.

4. The electronic device of claim 3, wherein the second side wall comprises the engaging module.

5. The electronic device of claim 4, wherein
the second side wall comprises a recessed wall toward the inside of the housing, and
at least a portion of the recessed wall is the engaging module.

6. The electronic device of claim 5, further comprising a rib configured to slidably guide the module, the rib being on a surface of the second side wall on side of the outside of the housing and extending across the recessed wall.

7. The electronic device of anyone of claim 1, wherein the second protrusion is with the second side wall as one.

8. The electronic device of anyone of claim 1, wherein a wiring connected to the connector is led to the inside of the housing from a position closer to the first protrusion than the second side wall.

9. The electronic device of anyone of claim 1, further comprising a second recessed wall at a position overlapping portion of the connector in a direction perpendicular to either the first wall or the second wall, the second recessed wall supporting a functional component different than the connector and recessed toward the inside of the housing.

* * * * *